Aug. 14, 1951     E. B. BERGSMAN     2,564,519
MICRO-HARDNESS TESTER
Filed Dec. 5, 1946
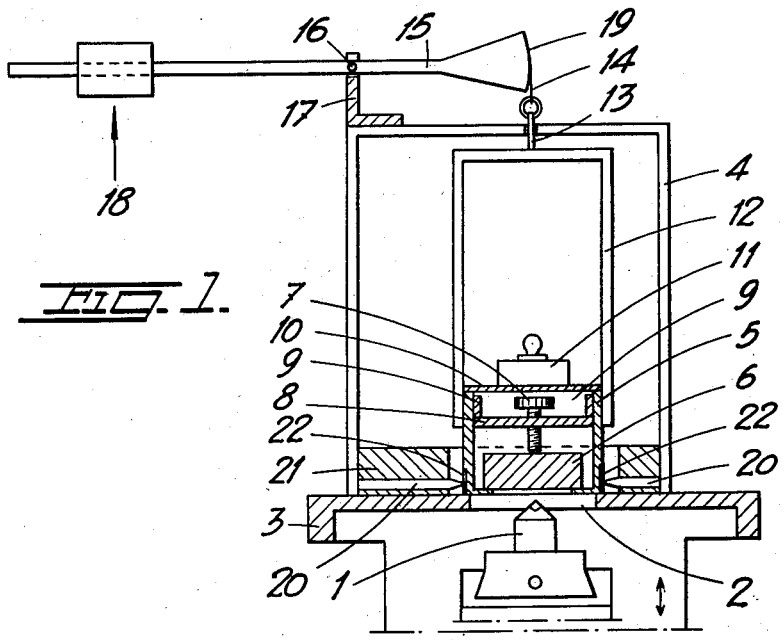
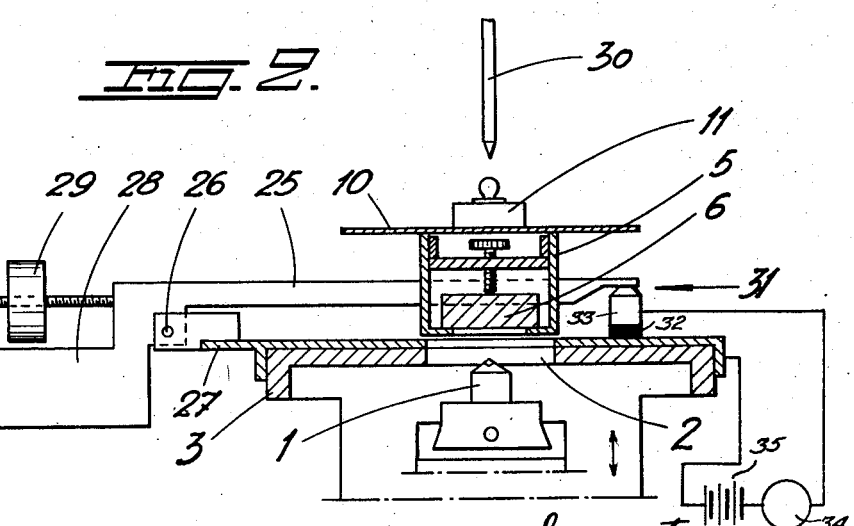

Patented Aug. 14, 1951

2,564,519

UNITED STATES PATENT OFFICE 2,564,519

MICRO-HARDNESS TESTER

Enar Börje Bergsman, Munkfors, Sweden

Application December 5, 1946, Serial No. 714,255
In Sweden March 8, 1944

Section 1, Public Law 690, August 8, 1946
Patent expires March 8, 1964

4 Claims. (Cl. 73—78)

The present invention relates to micro-hardness testing apparatus, and more particularly to apparatus of this kind which are designed for use in determining the hardness of small specimens of thin sheet metal or other more or less hard thin foils or layers comprising, for instance, carburized or decarburized zones or hardened steel, case-hardened surface layers and so on, or for testing small areas or individual components of the micro-structure of metals and like materials as well as for various other purposes, such for instance, as mineralogical researches.

A well known method of performing such testing operations is based on the principle of static indentation which consists in pressing an indenting element of a hard material, such as diamond, under the influence of a predetermined load into the material in a direction at right angles to the surface to be tested. In well known types of micro-hardness testers operating on this principle the test load and the means for controlling or determining the test load are combined with the indenting body or its supporting element or carrier.

In order that a micro-hardness tester designed for metallographical or mineralogical purposes may suit the requirements, its precision of operating must be good, so that a selected point or component of structure may be exactly hit by the indenting body. In case of a tester having a movable indenting body combined with a test load and controlling means therefor, quite special arrangements are required in order that a satisfactory degree of precision may be obtained. This, however, renders the apparatus complicated and expensive.

The object of the invention is to provide a micro-hardness tester operating on the static indentation principle but in which the drawbacks above set forth are avoided.

The invention is characterized, chiefly, by the fact that a carrier for the specimen to be tested and the test load are suspended or otherwise carried at one end of a balanced lever or beam in a position above an indenting body with the surface to be tested facing downwardly towards the upwardly directed point of the indenting body, so that the impression may be made by approaching the indenting body and the specimen to each other until the indenting body is just about to raise the specimen carrier from its supporting surfaces. By this expedient the indenting body need not be combined with any means for controlling or measuring the test load.

As an additional advantage resulting from the invention the apparatus may be mounted on any type of microscope having an upwardly directed objective without requiring but very slight modifications.

As indenting body I may use an ordinary Vickers' diamond of the same kind as that now commonly used in performing usual hardness tests or so called micro-tests. Thus, the indenting body may be alternately used for micro-hardness tests and usual hardness tests. This is of no little importance because Vickers' diamonds are rather expensive and often hard to get.

In the accompanying drawing two embodiments of the invention are illustrated in a somewhat diagrammatic manner.

Each of Figs. 1 and 2 of the drawing shows a part sectional elevation of an individual one of said embodiments.

Like reference numerals indicate similar parts in both figures.

In the embodiment shown in Fig. 1, the numeral 1 designates the indenting body which may be assumed to be mounted in a metal microscope in substitution of the objective thereof. The diamond point of said body 1 is directed upwardly and the body as a whole is positioned below an opening 2 formed in the table 3. The table 3 may be assumed to be adjustable vertically with relation to the indenting body as indicated by the double-headed arrows. Supported by the table 3 is a portal like frame 4. Mounted in said frame is a vertically adjustable carrier 5 for supporting the specimen 6 to be tested. Said carriers 5 comprises, for instance, an open topped, preferably cylindrical cup-shaped member having an opening in its bottom too in register with the opening 2 in the table 3. Against the remaining bottom flange of said cup the specimen 6 is held pressed by means of a clamping screw 7 engaging a threaded boring in a bar 8 extending crosswise of the cup which engages by its ends loosely under a pair of abutments 9 on the inside of the cup 5. Placed on the top of the cup or carrier 5 is a plate or cover 10 adapted to act as a support for the test load 11. The carrier 5 is connected to the lower end of an inner frame or bow 12 connected at its top by means of a pin 13 and a rope or band 14 to one end of a lever or beam 15 pivoted at 16 to a bracket 17 on the top of the frame 4. The other end of said lever or beam 15 carries an adjustable counter weight 18. The lever arm connected to the bow 12 forms a circular segment concentric with respect to the axis of pivot 16 to the circumferential surface 19 to which the rope or band 14 is fastened so that it may roll thereon. By this means the swinging movements of the lever 15 on its pivot 16 cannot cause any tendency towards lateral displacements of the bow 12 or the elements supported thereby.

The bow 12 is guided vertically, in part, by means of the pin 13 engaging a boring formed in the middle of the upper member of frame 4 and, in part, by means of two horizontally extending pins 20 fixed in a bottom piece 21 of frame 4 which engage by their pointed ends vertical grooves 22 formed in the wall of member 5 on opposite sides thereof. It is to be noted that said guide pins 20 may be replaced by guide rollers if it is desired to obtain a still more accurate vertical guide.

By means of the counterweight 18 the weight of the specimen 11 and the carrier therefor with associated parts may be balanced. Any test load desired may then be obtained by placing a proper weight 11 on the top plate 19 of carrier 5.

It is to be noted, however, that the counterweight 18 may be dispensed with, in which case the test load will be represented by the sum of the test weight, as 11, and the weight of the specimen and its carrier. If it is desired to reduce the test load below that represented by the total weight of the specimen and its carrier, this may be done by setting the counterweight 18 so as to balance but a fraction of said total weight.

In Fig. 2 the indenting body 1 is similar to that shown in Fig. 1 and so is the table 3 with its opening 2. The specimen carrier 5 is also similar to that shown in Fig. 1 but is supported in a different way, in as much as it is directly attached to one end of a lever or beam 25 pivoted at 26 to a plate 27 mounted on the table 3. Supported at the other end of said lever 25 is a stationary counterweight 28 and a movable counterweight 29. By means of these two counterweights the specimen carrier 5 together with the specimen 6 may be balanced. The test load is obtained by placing a weight 11 of the value desired on the plate 19 resting on the top of member 5. In this case in effecting a testing operation the test weight 11 should be situated exactly above the point of the indenting body. To this end a vertical pointer 30 may be provided above the carrier 5 exactly on a line with the axis of the indenting body 1.

The moment at which the carrier 5 with the specimen and the test load is about to be lifted from the table top 27 under the action of the indenting body 1 may be determined, for instance, by an electrically operated optical or audible signal. In Fig. 2, numeral 32 denotes an insulating base for a conducting post for supporting the free end of the beam 25. The beam is electrically connected to the conducting (metallic) table top 27. Numeral 35 denotes a battery and 34 an electric lamp or other signalling element. When the free end of the beam 25 rests on the post 33 the circuit of lamp 34 is closed and the lamp is lighted; when the beam is lifted from the post, the circuit of the lamp is open. It is to be noted that the lamp of course, may also be fed from an alternating current circuit through a transformer.

The operation of both apparatus described is substantially identical and takes place as follows:

Before inserting the indenting body in the place of the objective of the microscope I set by means of the crosswire eye piece of the microscope the point or structural element to be tested in the middle of the field of sight. The objective of the microscope is then removed and replaced by the indenting body and its holder. The specimen and the indenting body are then approached to each other to such an extent as to cause them to engage each other and cause the carrier 5 due to said engagement to be about to lift itself from the top of the table 3. This position is maintained for a certain while, say 15 or 30 seconds. The specimen and the indenting body are then removed from each other and the indenting body and its holder are replaced by an objective by means of which the impression made in the specimen may be estimated or measured.

The embodiment shown in Fig. 2 may also be used in effecting scratch tests. To this end the indenting body should be first loaded and then the table 3 laterally displaced. The indenting body then makes a scratch in the surface of the specimen and by measuring the width of said scratch I may get an idea of the hardness of the specimen within various parts thereof.

What I claim is:

1. In a micro-hardness testing apparatus of the class specified, the combination of an upwardly pointed indenting element, a support therefor, a carrier for the specimen to be tested located above said indenting element so as to expose a lower surface of the specimen to the indenting element, said support and said carrier being movable vertically with relation to each other, means connected to said carrier for supporting a test load, a pivoted two-armed balance lever for carrying the specimen carrier and the load support by one of its arms, and a counterweight adjustably mounted on the other arm of said lever for balancing a part at least of said first-mentioned arms of said lever and the elements carried thereby.

2. In a micro-hardness testing apparatus of the class specified, the combination of an upwardly pointed indenting element, a support therefor, a table located above said element and formed with an opening thereabove, a two-armed balance lever pivotally mounted with respect to said table, a combined specimen carrier and test load support mounted on one arm of said lever above the opening in the table, and a counterweight on the other arm of said lever for balancing at least a part of said first-mentioned lever arm and the elements carried thereby.

3. In a micro-hardness testing apparatus of the class specified, the combination of an upwardly pointed indenting body capable of being inserted in a microscope in substitution of the objective thereof, a vertically movable specimen table above said body, said table having an opening in register with said body, a specimen carrier above said table, said carrier having an opening in register with the opening in the table, a balance lever pivotally mounted on the table, for supporting said specimen carrier and for allowing up and downward movements thereof, means for guiding said carrier in its up and down movements, and means for preventing lateral movements of the specimen carrier during its up and down movement with balance lever.

4. In a micro-hardness testing apparatus of the class specified, the combination of an upwardly pointed indenting body capable of being inserted in a microscope in substitution of the objective thereof, an objective table above said body, said table having an opening in register with said body, a specimen carrier provided above said table so as normally to rest thereon, said carrier having an opening in register with that of the table for exposing the lower surface of the specimen to the indenting body, means in connection with said carrier for clamping the specimen thereto, means in connection with said carrier for supporting a test load, a balance lever for supporting said carrier and allowing up and down movement thereof, and an electric signalling circuit under the control of the lever.

ENAR BÖRJE BERGSMAN.

REFERENCES CITED

The following references are of record in the file of this patent:

UNITED STATES PATENTS

| Number | Name | Date |
|---|---|---|
| 1,385,182 | Maire | July 19, 1921 |
| 1,768,512 | De Leeriw | June 24, 1930 |
| 2,122,203 | Gogan | June 28, 1938 |

FOREIGN PATENTS

| Number | Country | Date |
|---|---|---|
| 522,426 | Germany | Apr. 9, 1931 |
| 618,470 | Germany | Sept. 9, 1935 |
| 834,080 | France | Aug. 1, 1938 |
| 243,626 | Switzerland | Jan. 16, 1947 |